Figure 1:
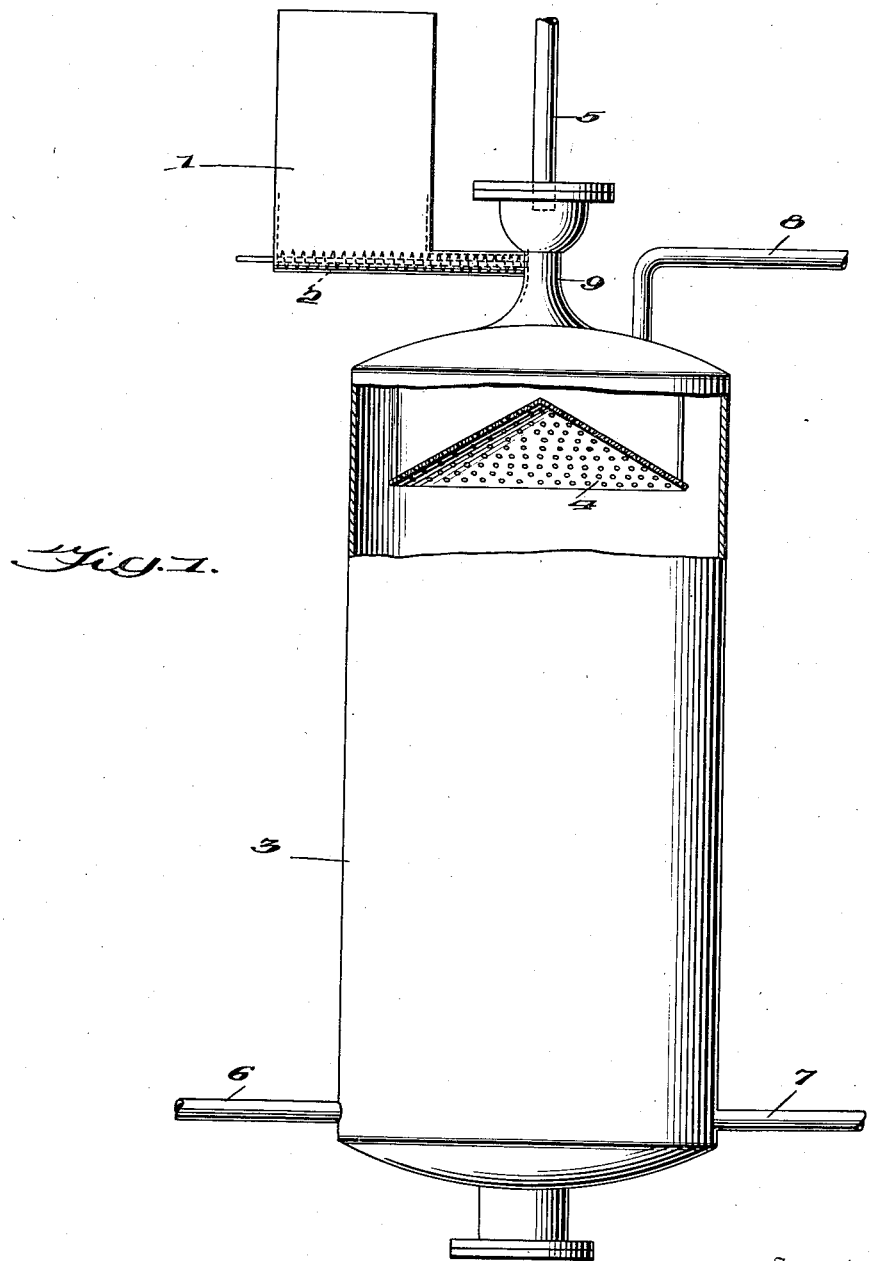

May 13, 1941.  A. DANCIGER  2,242,115
MANUFACTURE OF METAL CARBONYL
Filed July 13, 1938  2 Sheets-Sheet 1

Inventor
A. Danciger,
By Prescott & Prescott
Attorneys

May 13, 1941. A. DANCIGER 2,242,115
MANUFACTURE OF METAL CARBONYL
Filed July 13, 1938 2 Sheets-Sheet 2

Inventor
A. Danciger,
By Prewth+Prewth
Attorneys

Patented May 13, 1941

2,242,115

UNITED STATES PATENT OFFICE 2,242,115

MANUFACTURE OF METAL CARBONYL

Abraham Danciger, Tulsa, Okla.

Application July 13, 1938, Serial No. 219,073

4 Claims. (Cl. 23—203)

My invention consists in new and useful improvements in a method and apparatus for the manufacture of metal carbonyls by the interaction of carbon monoxide with selected metals.

Various methods have been proposed for carrying out this type of reaction, some of which involve the passage of carbon monoxide through a tower containing the metal employed for the reaction. However, these methods of procedure are accompanied by certain disadvantages in that at best, they are only partially continuous since the quantity of metal remaining in the tower decreases as the reaction proceeds and thus the rate of production of metal carbonyl diminishes until it becomes uneconomical when only a small portion of the original metal remains in the tower.

A further disadvantage of this type of process lies in the gradual building up of the back pressure through the tower which is caused by the break down of the metal by interaction with the carbon monoxide to an extremely fine powder which collects at the bottom of the tower and resists the discharging of the mixture of metal carbonyl and carbon monoxide from the tower.

Still other methods contemplate the introduction of the metal into the contact tower in the form of a paste or a suspension in liquid. For example, metal carbonyls themselves have been proposed for the liquid in which the metal is suspended but under these circumstances the rate of reaction between the carbon monoxide and the metal is reduced by reason of the fact that the liquid around the metallic particles prevents the necessarily close contact between the metal and the carbon monoxide. It is known that any film of foreign substance would reduce or even prevent reaction between carbon monoxide and metal, and the fact that the fluid used is the desired product of the reaction does not altogether counteract this undesirable action.

It is therefore one object of my invention to overcome these difficulties, and to this end I have provided a process and apparatus whereby a selected metal in a finely divided condition may be continuously charged to the contact tower in regulated quantities for contact with regulated quantities of carbon monoxide.

Another object of my invention is to provide a method and apparatus whereby a more intimate contact between the metal and carbon monoxide is assured which results in a more complete reaction and utilization of the metal employed.

It is well known that where interaction is desired between two substances, be it physical or chemical, the reaction is at an optimum when the streams are introduced into the reaction vessel countercurrently to each other.

In the manufacture of metal carbonyls, for example iron carbonyl, the two substances between which interaction is desired are carbon monoxide and iron. The introduction of carbon monoxide into the reaction vessel affords no difficulty, and I will therefore not go into detail on this phase of the method. On the other hand, introduction of iron in the form of a continuous stream presents a more difficult problem. It is therefore another object of my invention to provide a method and apparatus which will facilitate the countercurrent contact of finely divided iron with carbon monoxide.

Furthermore, in processes heretofore used, the carbon monoxide was necessarily subjected to very high pressures of the order of 3000 pounds per square inch, which necessitated the employment of very expensive equipment in order to withstand these high pressures with safety. It is therefore a further object of my invention to provide a method and apparatus whereby the manufacture of metal carbonyls may be carried out under relatively low pressures and without the requirement of expensive equipment.

I have found that by reducing the iron particles to extremely small dimensions, for example of from 10 to 500 microns or less in diameter, and charging them into the contact tower in the form of a very fine spray or cloud while at the same time introducing a stream of carbon monoxide to flow concurrently therewith, and a second stream of carbon monoxide to flow countercurrently thereto, the desired intimate contact may be obtained. The rate at which the iron particles pass through the tower is dependent on several factors including the pressure behind the iron particles, the size of the iron particles, the rate at which said particles are fed into the tower, and the pressure and size of the countercurrent stream of carbon monoxide, all of which factors are under the control of the operator.

With the above and other objects in view which will appear as the description proceeds, my invention resides in the novel features hereinafter set forth, illustrated in the accompanying drawings and more particularly pointed out in the appended claims.

Figure 2:
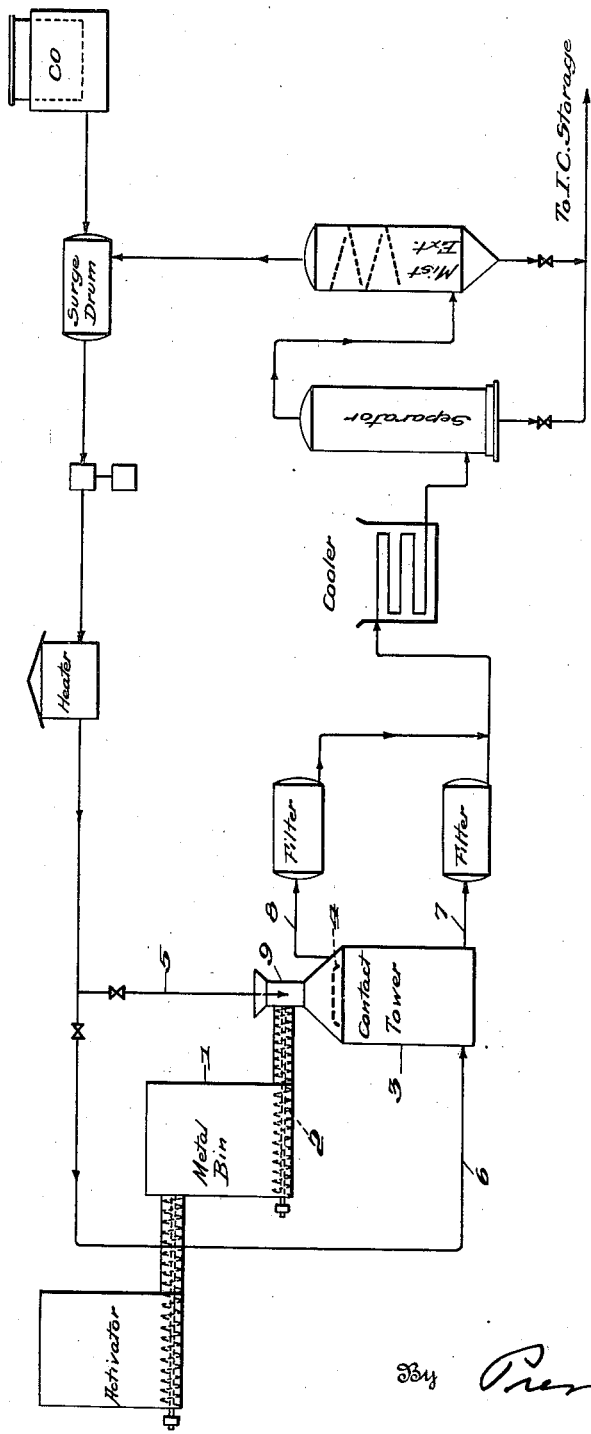

Referring to the drawings in which numerals of like character designate similar parts throughout both views, Fig. 1 is an enlarged detail of one form of contact tower embodying my invention, the iron bin and screw conveyor being shown diagrammatically, and Fig. 2 is a diagrammatic showing of one method of manufacturing iron carbonyl with which my invention may be advantageously employed.

In the drawings, referring particularly to Fig. 1, numeral 1 represents a storage tank or bin for the finely divided iron, said tank being provided with a screw conveyor 2 of any conventional form which terminates in communication with a reduced neck 9 at the top of a contact tower 3. Immediately below this reduced neck portion, I provide a baffle 4 in the form of an inverted saucer or cone, preferably provided with a series of orifices which tend to spread the stream of iron particles throughout substantially the entire cross section of the tower. Above the reduced neck 9, I connect a carbon monoxide inlet line 5 through which a stream of carbon monoxide is introduced to flow concurrently with the finely divided iron introduced into the tower. This stream of carbon monoxide is primarily intended to facilitate the introduction and spraying of the iron particles, although it has the additional effect of reacting with the iron particles to form iron carbonyl.

A second carbon monoxide inlet line 6 is connected into the lower portion of the tower 3 through which a stream of carbon monoxide is introduced to flow countercurrent to the downfalling spray of iron particles, thus insuring an intimate contact of these elements and a more complete reaction in the formation of iron carbonyl.

The lower portion of the tower is also provided with an iron carbonyl discharge line 7 through which some of the iron carbonyl formed in the tower, accompanied by a portion of the excess carbon monoxide, is removed as will hereinafter appear, while the remainder of the iron carbonyl, together with the major portion of the excess carbon monoxide, is withdrawn at the top of the tower through discharge line 8.

My improved method and apparatus for contacting iron particles and carbon monoxide may be advantageously used in connection with a continuous process of manufacturing iron carbonyl such for example as illustrated and described in the co-pending application Serial No. 219,041, filed July 13, 1938 of Morris Levine, and as illustrated herein in Fig. 2 of the accompanying drawings. Referring to this figure, iron particles which have been reduced to a very finely divided condition, preferably sponge iron ground so fine that substantially all of it passes through a 325 mesh screen, is subjected to activation by passage therethrough of hydrogen or other suitable non-oxidizing gas at a temperature of from 400° F. to 750° F., preferably at about 600° F., and allowed to cool to a temperature below 200° F., is stored in bin 1. Hydrogen or other reducing gas may also be employed for the activation treatment, which may if desired, take place in bin #1. The finely divided iron is introduced by means of the screw conveyor 2 into the reduced neck 9 of the tower 3. Simultaneously, a stream of heated carbon monoxide, pumped under a pressure of from 200 to 1000 pounds per square inch, preferably about 600 pounds per square inch, is introduced into the top of the tower through line 5 to meet the incoming finely divided iron. This stream of carbon monoxide together with the particles of iron form a spray or cloud which contacts the perforated baffle 4 and is spread out substantially over the cross sectional area of the tower.

A second stream of carbon monoxide is introduced at a lower pressure, for example 500 pounds per square inch, into the lower portion of the tower 3 through line 6 to flow in a countercurrent direction to the down-coming spray of iron particles. This lowered pressure is essential for the proper dissemination of the iron particles. The incoming carbon monoxide is heated to a temperature such to insure an operating temperature in the contact tower of from 150° F. to 400° F., preferably from 225° F. to 300° F.

As a result of this intimate contact between the spray of iron particles and the streams of carbon monoxide, the iron is substantially completed reacted to form iron carbonyl which is withdrawn through line 7, filtered to remove any entrained iron particles, and then cooled prior to introduction into a separator for separating any remaining carbon monoxide. The carbon monoxide is separated from the last traces of iron carbonyl by passage through an absorption plant, but preferably through a mist extractor, and is returned to the stream of fresh carbon monoxide for recycling through the system.

The excess carbon monoxide in the contact tower is removed through line 8, filtered and preferably admixed with the filtered stream of iron carbonyl and carbon monoxide discharged from the contact tower through line 7. To all of the excess carbon monoxide is added fresh carbon monoxide in an amount equal to that consumed in the process.

The rate at which the gas is introduced into the tower may vary from a volume of 34 cu. ft. as measured at sea level and 60° F., per pound of finely divided iron employed, to a volume of 1000 cu. ft. or more. The greater the quantity of gas added, the greater is the assurance that the iron will be substantially consumed. The addition of 500 to 750 cu. ft. of carbon monoxide, per pound of iron, however, has been found to give good results.

The foregoing description contemplates the use of my invention in a process wherein means are provided for heating the carbon monoxide before introduction into the tower. However, in a process where such preheating means is not employed, it is necessary to heat the contact tower itself in order to insure the proper operating temperature. This may be accomplished by any convenient means, such for example as a heating jacket through which hot fluids pass around the walls of the tower, and as disclosed in said co-pending application of Morris Levine in connection with his pre-activating step.

It will be apparent that an operation conducted in accordance with my invention is attended by numerous advantages. The formation of iron carbonyl is continuous and the rate of production remains constant throughout the length of the run as distinguished from the gradually diminishing rate of formation in other methods.

By reason of the fact that the iron particles are very small and thus expose a maximum surface to the action of the carbon monoxide, the rate of reaction under a given set of conditions of temperature and pressure is much greater than experienced heretofore. For this reason, the pressure in the system can be actually decreased.

In previous processes where carbon monoxide was passed through a tower filled partially or wholly with iron there has been a marked tendency toward channelling of the iron, under which conditions the rate of formation of iron carbonyl is greatly reduced as only a part of the iron is exposed to the action of the carbon monoxide. In my present process, however, channelling cannot occur and as a result, all of the iron in the tower is exposed to the action of the gas, which circumstance tends to to increase the rate of formation of the iron carbonyl.

Furthermore, the pressure differential between the inlet and discharge ends of the tower employed in my process is much smaller than that existing in towers heretofore employed. Thus, for a given pressure in the discharge end of the tower, the pressure in the system on the inlet side of the tower may be smaller.

In conducting my process, the finely divided iron is preferably added at such a rate and in such an active state that it is substantially converted into iron carbonyl before it reaches the tower outlet, and no increase in back pressure is experienced. For this reason, a run can proceed almost indefinitely.

In the foregoing description, while I have given iron as an example of the metal employed in the manufacture of carbonyl, it is to be understood that I do not intend to confine myself to this particular metal. It will be apparent that with slight modifications of conditions, my invention may be adapted to processes for the manufacture of various metal carbonyls, such for example as those of nickel, cobalt, chromium, tungsten, molybdenum, ruthenium, and other metals capable of reacting with carbon monoxide to form carbonyls, or with a mixture of carbon monoxide and nitrous oxide to form nitroso carbonyls.

Furthermore, it will be understood that my reference to a screw conveyor is merely by way of illustration, as any convenient means may be employed for continuously charging the tower with the finely divided metal. For example, a pump of the type designed to convey solids may be used if desired. I have also found that sand blasting equipment, with some changes, may be used for the introduction of the finely divided metallic particles together with the carbon monoxide.

While the discussion of the above disclosure has been limited to the action of carbon monoxide on finely divided metal to form carbonyls, it will be understood that this invention includes the reaction between finely divided metals above mentioned with a mixture of carbon monoxide and nitrous oxide to form nitroso carbonyls. All of the claims are to be read in the light of this more complete disclosure.

From the foregoing it is believed that the operation and advantages of my invention may be readily understood by those skilled in the art without further description, it being borne in mind that numerous changes may be made in the details disclosed without departing from the spirit of my invention as set out in the following claims.

What I claim and desire to secure by Letters Patent is:

1. In the continuous process of manufacturing metal carbonyls by the interaction of metal with carbon monoxide, the step of continuously spraying a finely divided metal into a contact tower, admixing therewith a concurrently flowing stream of carbon monoxide introduced in the tower at a point adjacent to the point of introduction of said finely divided metal, and contacting therewith a second stream of carbon monoxide introduced at a point in the tower remote from the point of introduction of said finely divided metal, and caused to flow countercurrent to said stream of finely divided metal.

2. In the continuous process of manufacturing metal carbonyls by the interaction of metal with carbon monoxide, the step of continuously spraying a finely divided metal, selected from a group consisting of iron, nickel, cobalt, chromium, tungsten, molybdenum, and ruthenium, into a contact tower, admixing therewith a concurrently flowing stream of carbon monoxide introduced in the tower at a point adjacent to the point of introduction of said finely divided metal, and contacting therewith a second stream of carbon monoxide introduced at a point in the tower remote from the point of introduction of said first named streams and caused to flow countercurrent thereto.

3. The process of manufacturing metallic carbonyls which comprises preparing a selected metal in a finely divided state, continuously spraying the same into a contact tower in admixture with a stream of carbon monoxide under superatmospheric pressure, said stream being introduced into the tower at a point adjacent to the point of entry of the finely divided metal, contacting the finely divided metal with another stream of carbon monoxide introduced into the tower at a point remote from the point of entry of said finely divided metal, the said second stream of carbon monoxide being caused to flow in a direction countercurrent to that of the initial direction of the stream of metal particles, removing the metal carbonyl formed, separating the carbon monoxide and metal particles that may be associated with it, removing the carbon monoxide, separating it from any metallic carbonyl and metal that may be associated with it, combining the carbon monoxide so obtained with the carbon monoxide separated from the metal carbonyl, admixing it with fresh carbon monoxide equal in amount to that consumed in the process, and recirculating it for reaction with a further quantity of the finely divided metal.

4. The process of manufacturing metallic carbonyls which comprises preparing a metal, selected from a group consisting of iron, nickel, cobalt, chromium, tungsten, molybdenum, and ruthenium, in a finely divided state, continuously spraying the same into a contact tower in admixture with a stream of carbon monoxide under superatmospheric pressure, said stream being introduced into the tower at a point adjacent to the point of entry of the finely divided metal, contacting the finely divided metal with another stream of carbon monoxide introduced into the tower at a point remote from the point of entry of the finely divided metal, the said second stream of carbon monoxide being caused to flow in a direction countercurrent to that of the initial direction of the stream of metal particles, removing the metal carbonyl formed, separating the carbon monoxide and metal particles that may be associated with it, removing the carbon monoxide, separating it from any residual metal carbonyl and metal that may be associated with it, combining the carbon monoxide so obtained with the carbon monoxide separated from the metal carbonyl, admixing it with fresh carbon monoxide equal in amount to that consumed in the process, and recirculating it for reaction with a further quantity of the finely divided metal.

ABRAHAM DANCIGER.